United States Patent [19]
Saito et al.

[11] 4,365,057
[45] Dec. 21, 1982

[54] METHOD FOR DRYING POLYOLEFINS

[75] Inventors: Shinichi Saito; Kazuo Aikawa; Michio Orino; Kazuya Aoi; Hideo Kusakabe, all of Ichihara, Japan

[73] Assignee: Sumitomo Chemical Company, Limited, Osaka, Japan

[21] Appl. No.: 24,268

[22] Filed: Mar. 27, 1979

[30] Foreign Application Priority Data

Jun. 29, 1978 [JP] Japan ................... 53-79382

[51] Int. Cl.³ .............................. C08F 6/10
[52] U.S. Cl. .................. 528/503; 528/480; 528/502
[58] Field of Search ............... 528/503, 480

[56] References Cited

U.S. PATENT DOCUMENTS 3,139,415 6/1964 Speed ................. 528/503 X
3,189,588 6/1965 Hull .................... 528/503 X
3,547,865 12/1970 Hoch ................... 528/494 X
3,625,932 12/1971 Green .................. 526/918 X
3,775,389 11/1973 Hundmeyer ........... 528/497
4,012,461 3/1977 van Brederode ...... 528/497 X Primary Examiner—C. A. Henderson
Attorney, Agent, or Firm—Birch, Stewart, Kolasch & Birch

[57] ABSTRACT

Method for drying poly($\alpha$-olefins) comprising contacting poly($\alpha$-olefins) having a content of hydrocarbon medium of 0.2 to 2% by weight with nitrogen gas having substantially no hydrocarbon medium and having a dew point of $-10°$ C. or lower in counterflow in a silo type through-flow drying apparatus whereby poly($\alpha$-olefins) having a content of the hydrocarbon medium of less than 0.2% by weight can be obtained.

2 Claims, 1 Drawing Figure

METHOD FOR DRYING POLYOLEFINS

FIELD OF THE INVENTION

The present invention relates to a method for drying poly(α-olefins). More particularly, it relates to an improved drying method of poly(α-olefins) which is characteristic by sufficiently reducing the concentration of a hydrocarbon medium which remains in polyolefins dried by conventional drying methods.

BACKGROUND OF THE INVENTION

Poly(α-olefins) such as polypropylene or low pressure polyethylene are produced by polymerizing a monomer and optionally a comonomer in the presence of a stereoregular catalyst in the presence or absence of a hydrocarbon medium, followed by deactivating the catalyst with an alcohol in a hydrocarbon medium, extracting the deactivated catalyst with water, treating the resulting slurry of the solid polymer in a hydrocarbon with a centrifugal separator to separate the slurry into a hydrocarbon phase which contains atactic polymers and a polyolefin cake which contains a small amount of the hydrocarbon medium, and then drying the cake.

The poly(α-olefin) cake containing a hydrocarbon medium has usually been dried in two steps. In the first step, it is dried with a heated nitrogen gas, which contains hydrocarbon medium and has a dew point of 50° C. or lower, using a dryer such as a flush dryer, a fluidized bed dryer, a rotary dryer, until the concentration of the hydrocarbon medium becomes 0.2 to 2% by weight, and in the second step, it is dried by using the same dryer as in the first step until the concentration of the hydrocarbon medium becomes 0.01 to 0.2% by weight. According to the known drying method, it is essential to use nitrogen gas having a dew point of −10° C. or lower in the second step in the light of the vapor-solid adsorption equilibrium of the hydrocarbons in the polyolefin phase and the nitrogen gas phase. However, the known drying method has a drawback that a large amount of the nitrogen gas should be used for the conventional dryers such as a fluidized bed dryer or a flush dryer. Accordingly, it is necessary to re-use repeatedly the nitrogen gas by circulating in the system in view of saving cost, and therefore, the nitrogen gas should be kept at the desired dew point of −10° C. or lower by cooling with a freezer and further should be again heated to, for example, 110° to 130° C., which results in a remarkable loss of heat.

SUMMARY OF THE INVENTION

As the result of the present inventors' intensive studies on an improved drying method of polyolefin powders without using a great amount of energy as in the known drying method, it has been found that the polyolefins can efficiently be dried by contacting the polyolefin powders with a small amount of nitrogen gas which contains substantially no hydrocarbon medium without using a freezer in the second step.

The main object of the present invention is to provide an improved drying method of polyolefins. This and other objects and advantages of the present invention will be apparent from the following description.

According to the present invention, a slurry of a poly(α-olefin) in a hydrocarbon medium is treated with a centrifugal separator, whereby almost all of the hydrocarbon medium is removed. The resulting poly(α-olefin) is dried in two steps, the first step comprising drying the polyolefin with heated nitrogen gas containing a hydrocarbon medium of a dew point of 50° C. or lower by a conventional drying method until the concentration of the hydrocarbon medium becomes 0.2 to 2% by weight, and the second step comprising drying further the resulting poly(α-olefin) containing 0.2 to 2% by weight of hydrocarbon medium by contacting the poly(α-olefin) with nitrogen gas having a dew point of −10° C. or lower in counterflow in a silo type through-flow drying apparatus until the concentration of the hydrocarbon medium becomes lower than 0.2% by weight.

DETAILED DESCRIPTION OF THE INVENTION

The poly(α-olefin) to be treated in the present invention includes polypropylene, low pressure polyethylene, and a copolymer of propylene and ethylene, which are usually treated in the form of powder.

The hydrocarbon mediums remained in the polyolefin are aliphatic hydrocarbons having 6 to 7 carbon atoms (e.g. n-hexane, methylpentanes, 4-methyl-1-pentene, dimethylbutanes, methylhexanes, heptane, etc.), alicyclic hydrocarbons having 6 to 7 carbon atoms (e.g. cyclohexane, methylcyclohexane, cycloheptane, etc.), aromatic hydrocarbons having 6 to 7 carbon atoms (e.g. benzene, toluene, etc.), and a mixture thereof, which are used as the solvent for polymerization reaction and as a washing liquid. Moreover, other solvents having a lower boiling point may also be included, and the remaining mediums may contain a small amount of other agents, such as a deactivating agent of catalyst (e.g. alcohols), a dehydrohalogenating agent (e.g. propylene oxide), an extracting solvent (e.g. water), and further unreacted monomers or comonomers.

The drying in the first step and the second step is carried out at a temperature of 70° to 130° C. When the drying temperature is over 130° C., the poly(α-olefin) is easily fused, and on the other hand, when the temperature is lower than 70° C., the drying speed is too low. In the first step, there can be used the conventional drying machines, such as a fluidized bed dryer, a rotary dryer, Solid Air (a tradename of Bepex Co., U.S.). In the second step, the drying machine is the silo type through-flow drying apparatus, which may specifically be constructed, or may be a conventional silo type storage vessels modified so as to fit to the desired design described as follows. That is, the apparatus is provided with a device for introducing poly(α-olefins) (usually a cyclone) at the upper part thereof and also a nitrogen gas-introducing inlet at the lower part thereof. Thus, a silo type through-flow drying apparatus is used as the drying machine in the second step. In order to heat the poly(α-olefin) in the second step, the silo type through-flow drying apparatus may optionally be provided with a jacket or a heating coil, but when the poly(α-olefin) is sufficiently heated in the first step, it is not necessary to heat more in the second step and it is sufficient merely to keep the temperature.

The drying of the poly(α-olefin) in the second step is carried out in the following manner. The poly(α-olefin) to be treated is charged into the silo type through-flow drying apparatus from the upper part thereof and descends by the gravity within the drying apparatus, whereby the polyolefin is contacted with nitrogen gas for a certain period of time, and thereafter, it is discharged from an outlet provided at the lower part of the drying apparatus. The nitrogen gas is supplied into the silo type through-flow drying apparatus from the lower part thereof and the nitrogen gas containing the hydrocarbon medium is discharged from the upper part thereof. The poly($\alpha$-olefin) powders to be treated are usually retained in the silo type through-flow drying apparatus for 0.5 to 20 hours on the average. The preferred retention time is in the range of 1 to 10 hours on the average. When the retention time of poly($\alpha$-olefin) is too short, the drying is not sufficiently achieved, and on the other hand, when the retention time is too long, the volume of the drying apparatus required is too large, which is disadvantageous from an economical viewpoint.

The nitrogen gas to be used in the second step contains substantially no hydrocarbon medium and has a dew point of $-10°$ C. or lower, preferably $-40°$ C. or lower. The industrial nitrogen gas usually satisfies this requirement. The amount of nitrogen gas to be used in the second step varies with the content of hydrocarbon medium of the poly($\alpha$-olefin) discharged from the outlet in the first step and also the temperature of the poly($\alpha$-olefin), and hence the, suitable amount of nitrogen gas can be determined by considering these conditions, but usually the nitrogen gas is used in an amount of 20 Nm$^3$ or larger, preferably 20 to 40 Nm$^3$, per 1 ton of the poly($\alpha$-olefin) to be treated.

The method of the present invention is illustrated in more detail with reference to the accompanying drawing.

BRIEF DESCRIPTION OF THE DRAWING

In FIG. 1, a cake of poly($\alpha$-olefins), from which most of the hydrocarbon medium has been previously removed by a centrifugal separator, is supplied to the first drying machine 2 (e.g. a box type fluidized bed dryer, a flush dryer, or a rotary dryer) through a line 1. Into the first drying machine 2 is supplied nitrogen gas which is condensed in a blower 9 and is heated with a heater 10, and in the first drying machine 2, the poly($\alpha$-olefins) are dried until the concentration of the hydrocarbon medium becomes lower than 2% by weight. The nitrogen gas which absorbs the hydrocarbon medium is sent to a cooling tower 4 through a line 3. In the cooling tower 4, a hydrocarbon medium is circulated through a line 5 by means of a pump 6 and is cooled with a cooler 7, by which the nitrogen gas is cooled until the temperature of the nitrogen gas at the outlet of the cooling tower 4 comes to a prescribed temperature (e.g. at 40° to 70° C.). By this treatment in the cooling tower 4, the hydrocarbon medium absorbed to the nitrogen gas is recovered and sent through a line 8 to a section for treating the recovered solvent (not shown in the figure).

Figure 1:
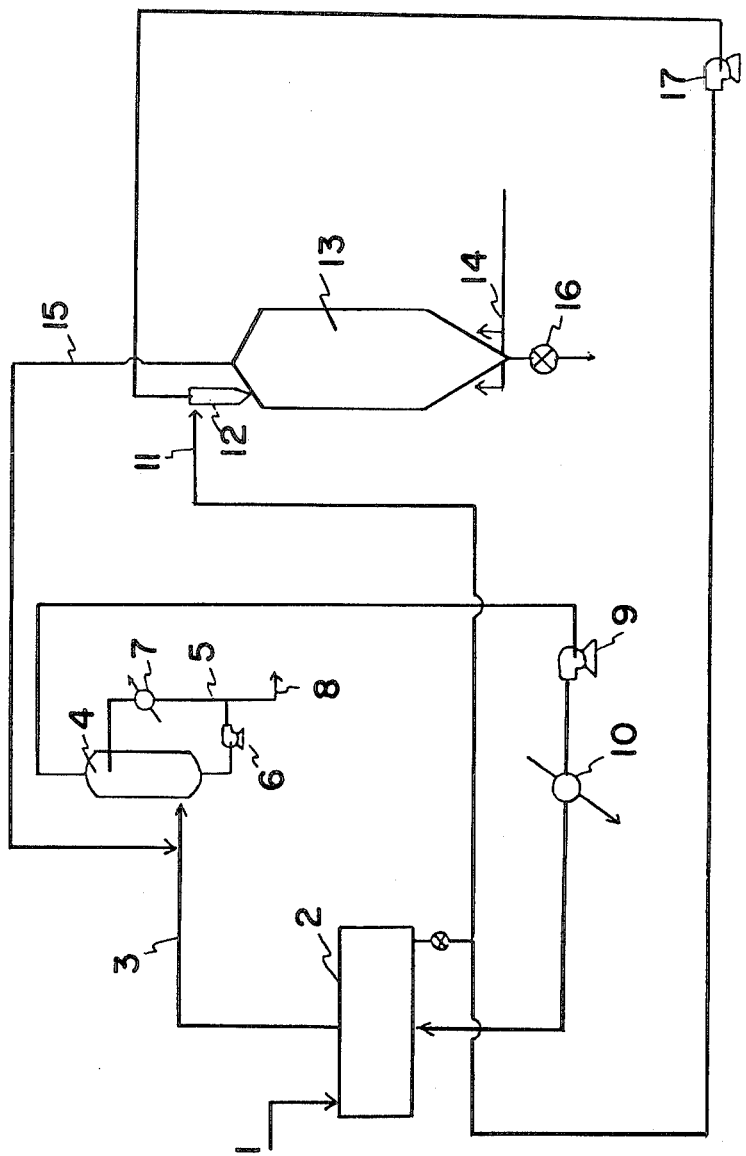
FIG. 1 shows one embodiment of the drying system of the present invention.

The poly($\alpha$-olefins) taken out from the first drying machine 2 are sent to the upper part of a silo type second drying machine 13, outer wall of which is covered with a heat insulating material, through a line 11 and a cyclone 12 by means of blower 17. The poly($\alpha$-olefins) descend by gravity in the drying apparatus 13 while contacting with nitrogen gas in counterflow and are removed from the lower part of the drying machine 13 via a valve 16.

An industrial nitrogen gas, which contains substantially no hydrocarbon medium, is supplied into the silo type drying machine 13 from the lower part thereof via a line 14 and ascends in the apparatus while contacting the poly($\alpha$-olefins) in counterflow and is taken out from the upper part thereof and is sent to the cooling tower 4 through a line 15.

The present invention is illustrated by the following Examples, but is not limited thereto.

EXAMPLE 1

In the flow sheet as shown in FIG. 1, a fluidized bed dryer as the first drying machine and a silo type through-flow drying apparatus as the second drying machine were used. A cake of propylene homopolymer containing heptanes (heptanes content: 29% by weight on wet basis) was subjected to drying under the conditions as shown in Table 1. Said propylene homopolymer had an intrinsic viscosity measured in tetralin at 135° C. of 1.63 dl/g (hereinafter, the viscosity is defined as $[\eta]_{135° C.}^{tetralin} = 1.63$). Industrial nitrogen gas of 30 Nm$^3$ was used per 1 ton of the polymer. As a result, dried powders of propylene homopolymer which had a hydrocarbon medium content of 600 ppm by weight obtained.

EXAMPLE 2

By using the same drying apparatus as used in Example 1, a cake of ethylene-propylene random copolymer ($[\eta]_{135° C.}^{tetralin} = 1.85$, ethylene content: 3.3% by weight) containing heptanes (heptanes content: 35% by weight on wet basis) was subjected to drying under the conditions as shown in Table 1. Industrial nitrogen gas of 40 Nm$^3$ was used per 1 ton of the polymer. As a result, dried powders of the polymer which had a hydrocarbon medium content of 800 ppm by weight were obtained.

TABLE 1

| | Example 1 | Example 2 |
|---|---|---|
| First drying machine | | |
| Temperature of polymer at outlet (°C.) | 125 | 120 |
| Content of hydrocarbon medium in polymer at outlet (% by weight) | 0.7 | 0.8 |
| Second drying machine | | |
| Temperature of polymer at outlet (°C.) | 108 | 102 |
| Retention time of polymer (hour) | 5 | 6 |

What is claimed is:

1. A method for drying a poly($\alpha$-olefin), which comprises supplying nitrogen gas having a dew point of $-10°$ C. or lower into a silo type through-flow drying apparatus from the lower part thereof and contacting a poly($\alpha$-olefin) having a content of hydrocarbon medium of 0.2 to 2% by weight with said nitrogen gas in counterflow in said drying apparatus, the amount of nitrogen gas supplied being 20 to 40 Nm$^3$ per 1 ton of the poly($\alpha$-olefin), said drying in the silo type through-flow drying apparatus being carried out at a temperature of 70° to 130° C. and a retention time of the poly($\alpha$-olefin) of 0.5 to 20 hours.

2. In a method for drying poly($\alpha$-olefins), which comprises the steps of subjecting poly($\alpha$-olefins) containing a hydrocarbon medium to centrifugation in order to remove most of the hydrocarbon medium and drying the poly($\alpha$-olefins) thus treated in a drying machine until the content of the hydrocarbon medium comes in the range of 0.2 to 2% by weight, the improvement which comprises supplying nitrogen gas having a dew point of −10° C. or lower into a silo type through-flow drying apparatus from the lower part thereof and contacting said poly(α-olefin) having a content of hydrocarbon medium of 0.2 to 2% by weight with said nitrogen gas in counterflow in said drying apparatus, the amount of nitrogen gas supplied being 20 to 40 Nm³ per 1 ton of the poly(α-olefin), said drying in the silo type through-flow drying apparatus being carried out at a temperature of 70° to 130° C. and a retention time of the poly(α-olefin) of 0.5 to 20 hours.

* * * * *